June 3, 1958 M. KRETZ 2,836,986
CONTROL AID
Filed July 21, 1954 4 Sheets-Sheet 1

Inventor
Marcel Kretz
by Brown & Seward
Attorneys

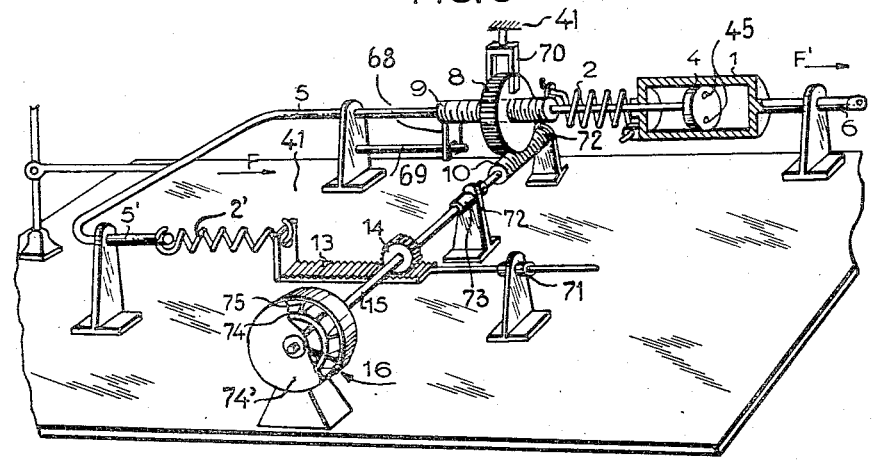
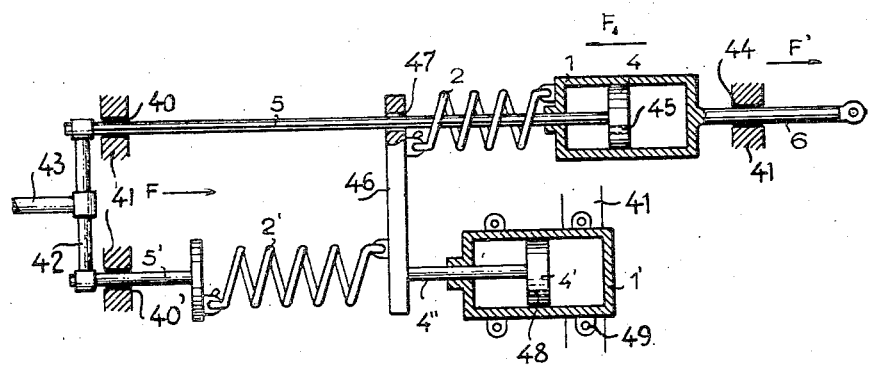

June 3, 1958 M. KRETZ 2,836,986
CONTROL AID
Filed July 21, 1954 4 Sheets-Sheet 3

Inventor
Marcel Kretz
by Brown & Seward
Attorneys

June 3, 1958  M. KRETZ  2,836,986
CONTROL AID
Filed July 21, 1954  4 Sheets-Sheet 4
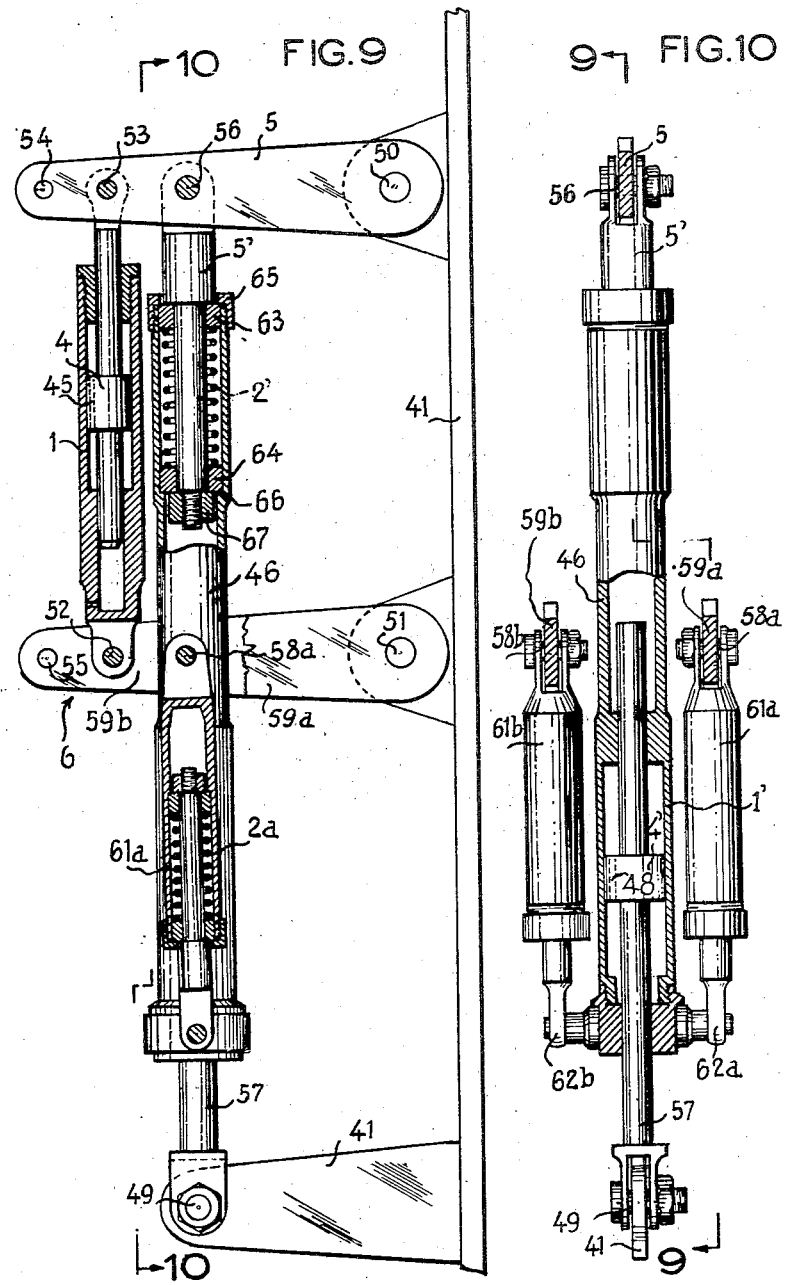
Inventor
Marcel Kretz
by Brown & Seward
Attorneys

United States Patent Office 2,836,986
Patented June 3, 1958

2,836,986

CONTROL AID

Marcel Kretz, Paris, France, assignor to Giravions Dorand, Paris, France, a French company Application July 21, 1954, Serial No. 444,840

Claims priority, application France August 5, 1953

8 Claims. (Cl. 74—470)

When a controlled member has to cause displacement of a considerable mass, which is, for example, the case for an aircraft control surface having to determine certain evolutions of the aircraft, it is exceedingly difficult, when the control and controlled members are interconnected through a positive transmission to impart the controlled member with the complex motions required to obtain simple displacements of the said mass.

To make more easily understood the problem to be solved, I will first refer to a series of diagrams showing curves of displacement as a function of time. These diagrams are designated in the appended drawings by Figs. 1 to 3, respectively showing the control of a mass with a positive transmission between the control and controlled members by a simple step displacement of the control member, a correct simple displacement of a mass effected through such a positive transmission, but implying a complex motion of the control member and, finally, the same correct displacement of a mass effected through a control aid according to the invention and implying a mere step displacement of the control member. Each of these three diagrams includes three curves, respectively designated by $a$, $b$, $c$, and respectively showing the behaviour of a control member such as a pilot stick, a controlled member, such as an aircraft control surface and the mass to be finally controlled, such as said aircraft.

If, for example, the control member is given a simple step displacement, as shown in Fig. 1$a$, a positive transmission will produce a corresponding step displacement of the controlled member, as shown in Fig. 1$b$. This results, in turn, in the application of a constant force to the mass to be finally displaced, so that said mass is imparted with a uniformly accelerated motion, as shown in Fig. 1$c$.

Now, if a step displacement of the mass itself is desired, such as, in an aircraft, a positional shift of said aircraft, e. g. a variation of the pitch angle, the ideal motion to be imparted to the controlled member may be represented by a curve having roughly the shape shown in Fig. 2$b$. With a positive transmission, the control member then should be imparted with a similar complex motion, as shown in full line in Fig. 2$a$. Now, if the control member is, for example, the stick of an aircraft, it is obvious that it is practically impossible for the pilot to effect exactly the required motion. As a matter of fact, the pilot will approach more or less the ideal conditions of piloting and the motion he will impart to his stick will have more or less the shape of the curve shown in dot-dash line in Fig. 2$a$. This is the basic difficulty of pilot training.

The invention has for its purpose to provide a control aid to be interposed between a control and a controlled member and capable of imparting to the latter a complex motion, of the type shown in Fig. 3$b$, in response to a simple step displacement of the control member, of the type shown in Fig. 3$a$, so as to finally obtain a required displacement of the mass, of the type shown in Fig. 3$c$.

It may be seen in Fig. 3$b$ that the above mentioned complex motion, to be imparted to the controlled member, essentially comprises three phases; the first one, $oA$, is a mere step displacement; the second phase, $AB$, is a progressive return of the controlled member towards its initial position and the third phase, $BC$, is a progressive displacement, in the same direction as in the first phase, of the controlled member from the intermediary position B to the final position C.

Now, it is known that any displacement effected at any speed may be considered as the result of the integration of a plurality of step displacements. Thus, it will be easily understood that if the result shown in Fig. 3 is obtained for a small practically instantaneous displacement of the control member, it will be possible to impart the controlled member with any kind of motion, however complex and whatever its speed, from a far more simple displacement of the control member.

It is an object of the invention to provide a control aid including retardating means such as a dash-pot directly interposed between a control and a controlled member and capable of interconnecting the same in a substantially positive manner during quick displacements of said control member, which permits imparting said controlled member with the above mentioned first phase of motion $oA$, in response to a step displacement of the control member.

Another object of my invention is to complete the device described in the last paragraph by return-to-neutral elastic means to urge said controlled member towards its initial position.

There is thus obtained a transmission system capable of correcting the action exerted on the controlled member and that, for this reason, will be called hereinafter a "correcting system."

Now, in certain applications, such as in gun aiming, it is sometimes sufficient to impart the control member with the two first phases of the above described three-phase complex motion. In other words, in these simplified cases, the curve of the displacement of the controlled member will substantially correspond to $oA$—$AB$ of Fig. 3$b$.

It is therefore a further object of the invention to provide a control aid of the type described in the last but one paragraph further comprising second return-to-neutral elastic means, preferably having a non linearly varying strength directly interposed between the control and the controlled members. This second return-to-neutral elastic means, thus also subjected to the action of the above mentioned retardating means, have for effect to slowly decrease down to zero the return action of the first one, so that the latter only brings the control member back to a point B shifted with respect to the initial position of said controlled member in the direction of the step displacement $oA$ first imparted thereto. Thus, finally, the combined action of both retardated return-to-neutral elastic means causes a displacement of the control member substantially corresponding to phase AB of Fig. 3$b$.

It is, however, a more general object of my invention to provide a control aid wherein the above described correcting system is completed by a second system of transmission interposed between the control member and the correcting system having a time constant longer than that of the latter and capable of varying its action in such a manner as to reset the controlled member from the intermediary position B to the required final position C and which for this reason will be called, hereinafter, a "resetting system."

A more specific object of the invention is to provide a control aid of the type described in the last paragraph, wherein the above mentioned retardating return-to-neutral elastic means of the correcting system are interposed between the controlled member and a displaceable anchoring point and wherein the resetting system is constituted by means capable of shifting said anchoring point in the direction of the initial step displacement imparted to the control member, by a distance equal to the ordinate of point C, with respect to the initial position of the control member, in a time longer than the duration of the return stroke AB of said controlled member.

Another specific object of the invention is to provide a control aid of this type, wherein said anchoring point shifting means are constituted by additional separately retardated return-to-neutral elastic means interposed between said anchoring point and the control member and adapted to be armed upon displacement of the latter.

With this arrangement, it will be easily understood that, if the law of variation of the action of the retardated elastic means of each system is suitably chosen, it will be possible to impart the controlled member with a motion approaching the ideal motion comprising the three above mentioned phases oA, AB and BC.

Another specific object of the invention is to provide a control aid of the type described, wherein the said resetting system further comprises non-reversible transmission means interposed between the retardating elastic means of the resetting system and the anchoring point shifting means.

This arrangement offers the further advantage of dissociating the actions of both systems, which permits, in particular, to determine at will the result of the action of each system without perturbating that of the other one.

A further object of the invention is to provide a control aid comprising two transmission systems of the type described, wherein damped fly-wheel means are incorporated in at least one of these two systems, to modify its law of action.

It is to be well understood that the invention may be used as a control aid in a transmission between a control member and a controlled member of any kind. However, it is particularly interesting as an aid for piloting, for gun-aiming, and the like, wherein it is capable, not only of effecting automatically the correction of a control motion required for actuating a considerable mass, but also of partly compensating errors or delays due to the operator himself.

The expression "return-to-neutral" elastic means (or spring) designates in the description and claims one or more springs having a neutral state in which they exert no action on the members between which they are interposed and tending to reassume said state as soon as they are deformed either by compression or elongation.

Other objects and advantages of the invention will be apparent from the following detailed description, together with the accompanying drawings, submitted for purposes of illustration only and not intended to define the scope of the invention.

In these drawings, in addition to the already described Figures 1 to 3,

Fig. 4 is a schematic sectional view of a simple embodiment of the invention, wherein each transmission system of the control aid is merely constituted by a retardated return-to-neutral spring.

Fig. 5 is a perspective view of a modification in which a non-reversible gear is interposed between the two transmission systems.

Figure 1:
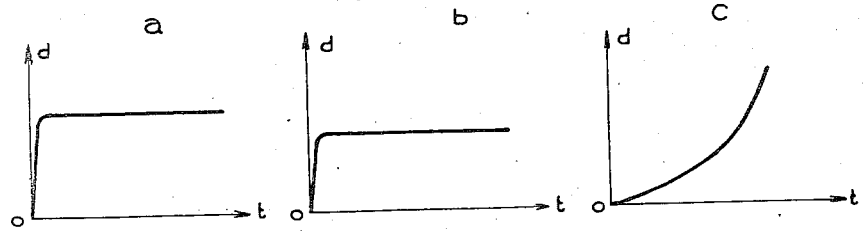
Figure 2:
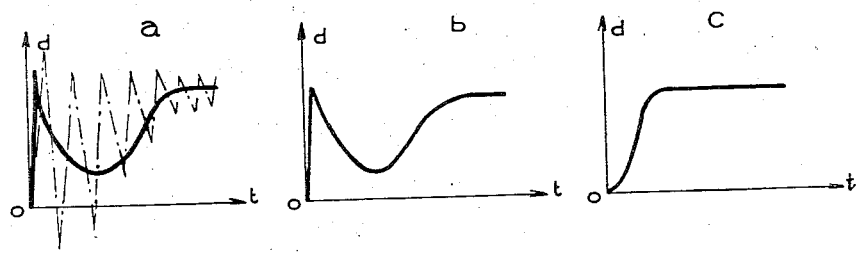

Figs. 9 and 10 are partly sectional, respectively elevational and plan views of a specific construction of the embodiment shown in Fig. 4, as viewed from lines 9—9 of Fig. 10 and 10—10 of Fig. 9, respectively.

As mentioned in the preamble, the control aid according to the invention comprises a correcting system to be interposed between a control member and a controlled member and a resetting system to be interposed between the control member and the correcting system. In all embodiments described hereunder, the control aid comprises, for that purpose, an input member to be connected with the control member to be aided and an output member to be connected with the controlled member to be actuated.

In the embodiment of Fig. 4, the input member comprises two rods 5 and 5' slidably mounted, as shown at 40, 40' on a fixed support 41 and fixedly interconnected through a cross-brace 42 which is provided with means such as a connecting-rod 43 to be connected with the control member, not shown. The output member is constituted by a rod 6 slidably mounted at 44 on the fixed support 41. The correcting system of this control aid comprises a dash-pot having its cylinder 1 fast with the output member 6 and its piston 4 fast with the rod 5 of the input member. 45 is the usual calibrated passage through piston 4. The correcting system further comprises a return-to-neutral spring anchored at one end on cylinder 1 and at its other end on an anchoring plate 46, through which rod 5 passes with clearance, as shown at 47. The resetting system comprises a second return-to-neutral spring 2' interposed between the rod 5' of the input member and the anchoring plate 46. The later is fast with the rod 4" of the piston 4' of a second dash-pot, the cylinder 1' of which is fixedly secured as shown at 49 on the fixed support 41. 48 is the usual calibrated passage of this second dash-pot.

Figure 3:
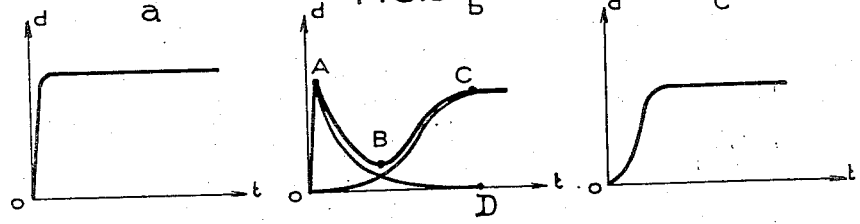

To explain the operation of this device, we will assume that the passages 45 and 48 of the two dash-pots are so calibrated that the time constant of the resetting system is very long as compared with that of the correcting system. However, the diameter of the calibrated passage 45 of the first dash-pot must be chosen sufficiently small to permit positive driving of the output member 6 against the action of spring 2 in response to quick displacements of the input member 5. In these conditions, if the input member 5 is suddenly displaced in the direction of arrow F, the output member 6 will be also suddenly displaced by the same distance in the direction of arrow F'; since the anchoring plate 46 is practically held stationary, during this quick displacement, by the dash-pot 1', the spring 2 will be elongated by the same distance and would slowly return the controlled member 6 in the direction of arrow F1 to its initial position in a time equal to the time constant of the correcting system, if the anchoring plate 46 were not shifted in the meantime by the resetting system. This shifting is effected by spring 2' which is compressed by the initial step displacement of the input member 5—5', simultaneously with the elongation of spring 2 and by the same distance, whereupon it begins to shift the anchoring plate 46 in the direction of the arrows F—F', under the retardating control of the dash-pot 1'. Now, since this shifting takes place far more slowly than the returning displacement of the output member 6, it will be easily understood that the spring 2 will have reassumed its neutral state, a long time before the completion of said shifting. From this time, that corresponds to point B of Fig. 3b, the output member 6 will change its direction of displacement once more to be slowly displaced in the direction of arrow F' by the anchoring plate 46 through the spring 2 and the dash-pot 1—4 until the system has reassumed its neutral state, the controlled member being then at point C of Fig. 3b. As a matter of fact, it may thus be seen that the correcting system, if acting alone, would, for a step displacement oA of the input member do impart to the output member 6 the displacement oAD in Fig. 3b.

Similarly, the resetting system, if acting alone, for the same displacement oA of the input member 5, would impart to the output member 6 the displacement oC. The resultant of the combined action of both systems is thus the sum of both curves oC, oAD i. e. the required curve oABC.

In the construction shown in Figs. 9 and 10, that corresponds to the embodiment of Fig. 4, the input member is constituted by a crank-arm 5 and the output member 6 has the shape of a yoke, said crank-arm and yoke being pivoted at 50, 51, respectively on a fixed support 41. The cylinder 1 of the dash-pot of the correcting system is articulated on the yoke 6 at 52, its piston 4 is articulated on the crank-arm 5 at 53 and connecting rods, not shown, may be articulated respectively at 54 and 55 to respectively interconnect the input and output members with the control member to be aided and the controlled member to be actuated. The anchoring member 46 is constituted by a hollow rod, a section of which is constituted by the cylinder 1' of the dash-pot of the resetting system, while another section of it contains the spring 2' of said system which is connected with the crank-arm 5 through a rod 5' articulated at 56 on said crank-arm. The dash-pot 1'—4' is inverted with respect to Fig. 4, its cylinder 1' being integral with the anchoring member 46, as described above, while its piston 4' is provided with a rod 57 articulated at 49 on the fixed support 41.

The elastic means of the correcting system have been duplicated. They comprise two springs 2a and 2b (the latter not shown) acting in parallel and each housed in a cylindrical casing, the casing 61a of spring 2a being articulated at 58a on the yoke, while the casing 61b of the spring 2b is articulated at 58b on the other arm 59b of said yoke. Each of the springs 2a, 2b is interposed between its casing and a rod, the two rods being articulated at 62a, 62b, respectively on the anchoring member 46.

A particular feature of this construction is that each return-to-neutral spring always acts as a compression spring, whatever may be the direction of the relative displacement which is imparted to the members between which they are interposed. This feature will be only described hereunder for spring 2', since the other springs 2a, 2b are designed in a similar manner. As shown, spring 2', pre-compressed if desired, bears at each end on a washer, respectively 63, 64, the displacement of which under extension of the spring is limited by a shoulder 65, 66, respectively, fast with the cylindrical casing of the spring. Now, in the neutral state shown in the drawing, the rod 5' bears at one end on washer 63 and at its other end on washer 64 through a nut 67; the rod 5' however is freely slidable in both washers. With this arrangement, if for example, the anchoring member 46 being stationary, the crank-arm 5 is displaced clockwise (in the drawing), the lower end of the spring 2' is shifted upward, so that the spring 2' is compressed, while if the crank-arm 5 is displaced anticlockwise, it is the upper end of the spring 2' which is shifted downward, whereby the spring 2' is also compressed. This arrangement, offers the advantage of avoiding any dead relative motion at the ends of the spring.

Figure 6:
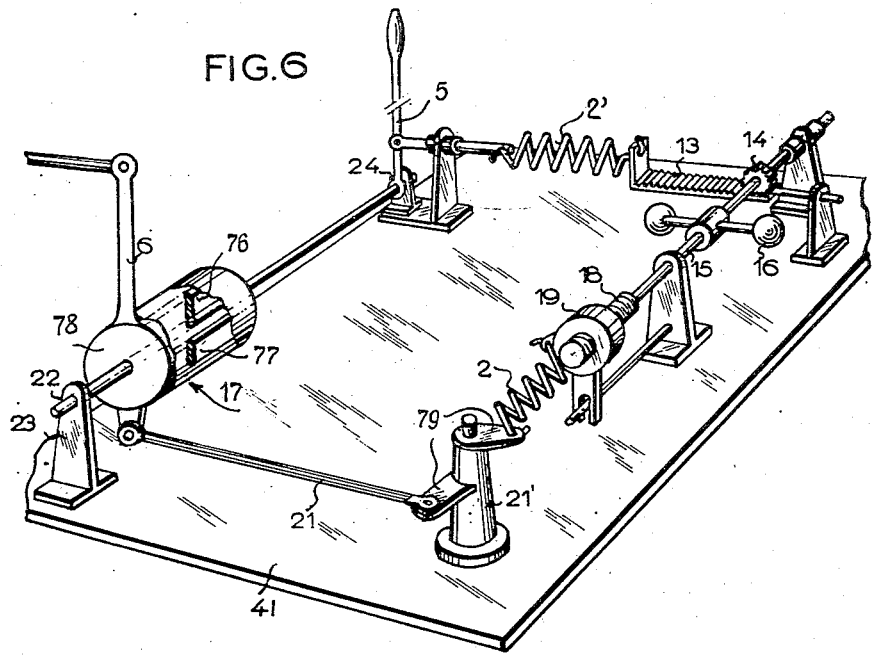
Fig. 6 is a perspective view showing an alternative construction of the device of Fig. 5, wherein the dash-pot of the correcting system is replaced by a rotary retardating device.
Figure 7:
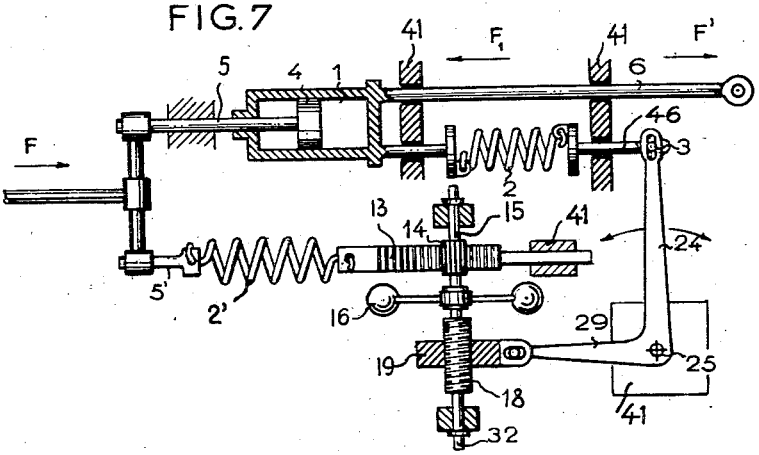
Fig. 7 is a schematic sectional view showing an alternative construction of the device of Fig. 5.

The alternative embodiments shown in Figs. 5, 6, 7, only differ from the one of Fig. 4 in that they are completed by non-reversible means interposed between the two systems of transmission of the control aid to suppress any interaction and in details of construction of certain of their elements. For these reasons, and since moreover, they operate substantially in the same manner as the device of Fig. 4, they will not be described in detail hereunder, only the particular features of each embodiment being explained.

In Fig. 5, the displaceable anchoring member of the spring 2 is constituted by a screw 9 slidably mounted on the rod 5 of piston 4 and prevented from rotating by a lug 68, slidable on a rod 69 fast with the fixed support 41. Said screw 9 is normally held stationary by a toothed wheel 8 formed as a nut cooperating with said screw and held against axial displacement, as shown at 70. In this embodiment, the spring 2' of the resetting system acts on a rack 13 slidably mounted at 71 on the fixed support 41, and meshing with a pinion 14 keyed on a shaft 15 journalled on the said support at 72 but held against axial displacement, as shown at 73. A damped fly-wheel 16 is furthermore provided. It comprises a fly-wheel 74 provided with blades 75, the rotation of which undergoes a braking action from an oil mass contained in a fixed casing 74' in a known manner. Finally, a worm screw 10 keyed on the shaft 15 meshes with the toothed wheel 8. With this arrangement, when the spring 2' tends to reassume its neutral shape after having been elongated or compressed, the toothed-wheel 8 is rotated through the rack 13, pinion 14, shaft 15 and worm-screw 10, so that the anchoring screw 9 is shifted axially in the same direction as that of the displacement of the input member 5 having caused the said elongation or compression of the spring 2'.

In Fig. 6, the retardating means of the correcting system are constituted by a rotary fluid damper having a driving member constituted by a paddle 76 rotatively fast with the input member 5 through a rod 22 journalled at 23—24 on the fixed support 41, the said paddle rotating in an oil mass contained in a cylindrical casing 78 provided with a fixed paddle 77 and constituting the driven member rotatively fast with the output member 6. A relative rotation between the paddles 76 and 77 may only take place under displacement of the oil through the gaps between the said paddles and the cylinder 78.

The rotation of the driven member 78 on either side of the neutral position causes compression or elongation of the spring 2 of the correcting system through a connecting rod 21 and a bell-crank lever 79 pivoted at 21' on the fixed support 41. In this embodiment, the anchoring member of the spring 2 is constituted by a nut 19 cooperating with a screw 18 keyed on the shaft 15 of the resetting system, the latter being substantially the same as in Fig. 5.

In the embodiment of Fig. 7, the correcting system is substantially the same as in Figs. 4 and 5 and the resetting system is substantially the same as in Figs. 5 and 6.

The only difference resides in the connection between both systems which, in Fig. 7, is ensured by a bell-crank lever 24—29 pivoted at 25 on the fixed support 41 and having one arm articulated at 3 through a suitable eyelet elongated in a direction longitudinal with respect to arm 24, on the anchoring member of spring 2 which is constituted, in this example, by a rod 46 slidably mounted on the support 41. The other arm 29 of the bell-crank lever is articulated through a similar eyelet on the nut 19.

Figure 8:
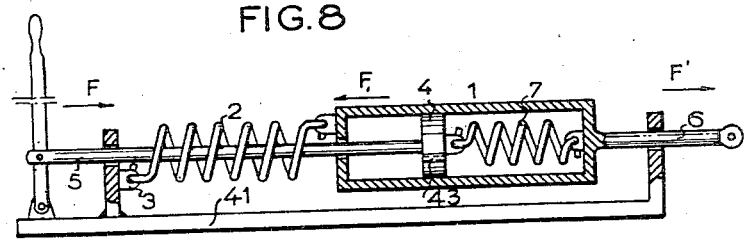
Fig. 8 shows a simplified control aid only comprising a correcting system.

In the simplified embodiment shown in Fig. 8, the control aid only comprises the correcting system including the dash-pot 4—1 directly interposed between the input and output members 5—6 and the return-to-neutral spring 2 anchored between the cylinder 1 of the dash-pot and a fixed anchoring member 3 fast with the fixed support 41. This device is completed by an auxiliary return-to-neutral spring 7 interposed between the piston 4 and cylinder 1. With this arrangement, if the input member 5 is suddenly displaced in the direction of the arrow F, the output member 6 is also displaced by the same distance in the direction of arrow F', thus elongating spring 2 also by the same distance. Thereupon, spring 2 begins to retract under the retarding action of the dash-pot 1—4, thus slowly returning the controlled member towards its initial position in the direction of the arrow $F_1$; but, in the same time, this causes compression of the auxiliary spring 7, which progressively reduces the returning action of the spring 2 until both springs assume their state of equilibrium substantially corresponding to point B, Fig. 3b, The spring 7 has preferably a non-linearly varying strength, which means that its strength, instead of increasing proportionally to a relative displacement between its ends, increases faster and faster, as it is compressed or elongated from its neutral state. This permits, for small amplitudes of the control motion to bring the controlled member to a point B that is but slightly distant from the initial position of said controlled member, while for larger amplitudes of the control motion, the ordinate of point B may be but slightly smaller than that of point A.

While the invention has been described with particular reference to a preferred embodiment, it is not intended to limit the scope of the invention to the embodiment illustrated, nor otherwise than by the terms of the subjoined claims.

In particular, it is to be well understood that a non-varying auxiliary spring such as 7 may be incorporated in the correcting system of anyone of the embodiments described above.

Moreover, the relation between the time constants of the two systems may be chosen at will, according to the form of the curve $oABC$ to be obtained. In certain cases, said time constants will be taken equal to each other. In other cases, that of the resetting system will be even taken shorter than that of the correcting system.

Furthermore, the ordinate of the final position C may be modified at will for a predetermined value of the ordinate of point A by providing, between the input member of the device and each one of the two transmission systems, multiplying or demultiplying means having different transmission ratios. This may be obtained for example in a very simple manner in the embodiment of Figs. 9 and 10 by modifying the position of one of the articulation points of a dash-pot or of a spring.

What is claimed is:

1. A control aid to be interposed between a control and a controlled member, comprising, in combination, a correcting system including retardating means directly interposed between said control and controlled members and adapted to interconnect the same in a substantially positive manner during quick displacements of said control member, a displaceable anchoring member and first return-to-neutral elastic means interposed between said anchoring and controlled members, and a resetting system including means to shift said anchoring member with respect to said controlled member in the direction in which the latter has been positively displaced by said control member, second return-to-neutral elastic means operatively connected between said control member and said anchoring member shifting means, and retardating means to control the action of said second elastic means on said shifting means.

2. A control aid according to claim 1, wherein said resetting system further comprises a non-reversible transmission interposed between said second return-to-neutral elastic means and said anchoring member shifting means.

3. A control aid according to claim 1, wherein fly-wheel means are incorporated in at least one of said systems, retardating means being furthermore provided to control the action of said fly-wheel means.

4. A control aid to be interposed between a control and a controlled member, comprising, in combination, a fixed support, an input member displaceably mounted on said support and adapted to be operatively connected with said control member, an output member displaceably mounted on said support, and adapted to be operatively connected with said controlled member, a correcting system including retardating means directly interposed between said input and output members and adapted to interconnect the same in a substantially positive manner during quick displacements of said control member, an anchoring member displaceably mounted on said support and first return-to-neutral elastic means interposed between said anchoring and output members, and a resetting system including means to shift said anchoring member with respect to said output member in the direction in which the latter has been positively displaced by said control member, second return-to-neutral elastic means operatively connected between said input member and said anchoring member shifting means and retardating means to control the action of said second elastic means on said shifting means, the time constant of said resetting system being longer than that of said correcting system.

5. A control aid according to claim 4, wherein said correcting system comprises a dash-pot having a cylinder element and a piston element, one of said elements being positively connected with said input member while the other one is positively connected with said output member, an anchoring member displaceably mounted on said support and a first return-to-neutral spring interposed between the said output and anchoring members and wherein said resetting system comprises a dash-pot having a cylinder element and a piston element, one of said elements being fixedly secured on said support, while the other one is positively connected with said anchoring member, a linkage displaceably mounted on said support and positively connected with said anchoring member and a second return-to-neutral spring interposed between said input member and said linkage.

6. A control aid according to claim 4, wherein said correcting system comprises a dash-pot having a cylinder element and a piston element, one of said elements being fixedly connected with said input member, while the other one is fixedly connected with said output member, a threaded rod slidably but non-rotatively mounted on said support, a first return-to-neutral spring fixedly anchored at one end on said threaded rod and fast at its other end with said output member and a tangential toothed-wheel rotatively but non-slidably mounted on said support and having an axial threaded bore screwingly engaged on said threaded rod and wherein said resetting system comprises a rack slidably mounted on said support, a second return-to-neutral spring interposed between said input member and said rack, a shaft rotatively mounted on said support and extending at right angles with said rack in the plane of said toothed-wheel, a pinion keyed on said shaft and meshing with said rack, a worm screw keyed on said shaft and meshing with said tangential wheel, a fly-wheel keyed on said shaft and damping means fixedly secured on said support to exert a braking action on said fly-wheel.

7. A control aid according to claim 4, wherein said correcting system comprises a dash-pot having a cylinder element and a piston element, one of said elements being positively connected with said input member, while the other one is positively connected with said output member, an anchoring member slidably mounted on said support, a first return-to-neutral spring interposed between said output member and said anchoring member, a bell-crank lever pivoted on said fixed support and having one arm articulated and longitudinal clearance on said anchoring member, a shaft rotatively but non-slidably mounted on said support, a screw keyed on said shaft and coaxial therewith, a nut slidably but non rotatively mounted on said support and meshing with said screw, the second arm of said bell-crank lever being articulated with longitudinal clearance on said nut and wherein said resetting system comprises a rack slidably mounted on said support and extending at right angles with said shaft, a second return-to-neutral spring interposed between said rack and said input member, a pinion keyed on said shaft and meshing with said rack, a fly-wheel keyed on said shaft and damping means fixedly secured on said support to exert a braking action on said fly-wheel.

8. Device for transmitting motion from a control element to a controlled element, both said elements being adapted to be moved from a neutral position in either one of two opposite directions, comprising, in combination, a lost motion connection between said control element and said controlled element, means to reduce said lost motion with increasing speed of the control motions of said control element for operating said controlled element in response to said control motions, and a normally balanced correcting system interposed between said control element and said controlled element for automatically introducing a desired correcting motion to said controlled element, said system including movable anchoring means, means for causing retardation of the movements of said anchoring means when the speed thereof exceeds a determined value, first resilient means connected to said anchoring means and connected to said controlled element to oppose motion thereof in both said directions relative to said anchoring means with a force proportional to the magnitude of the control motions transmitted to said controlled element, and second resilient means connected to said anchoring means and connected to said control element for opposing motion thereof in both said directions relative to said anchoring means with a force proportional to the magnitude of said control motions, said force of the first resilient means tending to move said controlled element back to said neutral position at a speed determined by said lost motion reducing means to thereby produce said correcting motion of the controlled element, and said force of the second resilient means causing said anchoring means to move in opposition to said correcting motion so as to limit the magnitude thereof and to readjust the controlled element in accordance with the predetermined delay due to said retardation means.

References Cited in the file of this patent

UNITED STATES PATENTS

| | | |
|---|---|---|
| 1,630,199 | Megnin | May 24, 1927 |
| 2,037,407 | Cremer | Apr. 14, 1936 |
| 2,090,246 | Alexander | Aug. 17, 1937 |
| 2,166,866 | Hansen | July 18, 1939 |
| 2,323,352 | Pitts | July 6, 1943 |